United States Patent
Ogden

[15] 3,682,995
[45] Aug. 8, 1972

[54] COPPER CHELATE
[72] Inventor: Paul H. Ogden, Woodbury, Minn.
[73] Assignee: Minnesota Mining and Manufacturing Company, St. Paul, Minn.
[22] Filed: May 4, 1970
[21] Appl. No.: 34,603

[52] U.S. Cl............260/438.1, 106/288 Q, 260/429 J
[51] Int. Cl................................................C07f 1/08
[58] Field of Search..........................260/438.1, 2 M

[56] References Cited

FOREIGN PATENTS OR APPLICATIONS

| | | | |
|---|---|---|---|
| 114,189 | 3/1918 | Great Britain | 260/438.1 |
| 556,687 | 4/1958 | Canada | 260/438.1 |

OTHER PUBLICATIONS

J. Amer. Chem. Soc., Vol. 75, pg. 5194 (1953) Baker et al.
Young et al. J. Amer. Chem. Soc. Vol. 84, pp. 2105–9 (1962)

Primary Examiner—Tobias E. Levow
Assistant Examiner—H. M. S. Sneed
Attorney—Kinney, Alexander, Sell, Steldt & DeLaHunt

[57] ABSTRACT

Copper chelates of fluorinated N,N' bisacylhydrazides and tetrakisacylhydrazides are provided which are insoluble in water but are soluble in nonpolar organic solvents and which are useful as dyes.

10 Claims, No Drawings

COPPER CHELATE

This invention relates to copper chelates. In particular, this invention relates to copper chelates of fluorinated N,N' bisacylhydrazides and tetrakisacylhydrazides.

It has been recognized by Young et al. [see "Journal of the American Chemical Society," 84:2105 (1962)] that bis-(trifluoroacetyl) hydrazine forms a precipitate with mercury ions in aqueous solution; however, Young et al. was unable to find a solvent which would dissolve this precipitate without decomposing it.

Applicant has found that nickel, zinc and cobalt also form insoluble precipitates with the fluorinated bis and tetrakisacylhydrazides. Surprisingly, however, applicant has also discovered that copper forms a water insoluble chelate with these hydrazides which is soluble in various organic solvents to produce brown-colored solutions and is recoverable therefrom on evaporation of the solvent. Examples of suitable solvents for the chelate are carbon tetrachloride, ethanol, acetone, trifluorotrichloroethane and trichlorofluoromethane.

Because of the organo-solubility of the chelate, it may be used as a coloring agent for lacquers or the like. Also, the chelate, when dissolved in a suitable low boiling point organic solvent, can be coated on photographic film.

When the solvent is removed, e.g., by air drying, a film and serves as an antihalation layer. This layer, due to its water insolubility will not migrate into the gelatin layer.

The chelates of this invention have the basic formula

RCONNCOR'XCu which can be represented structurally as follows:

which can be represented structurally as follows:

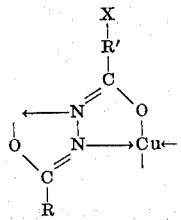

in which R is a monovalent saturated fluoroaliphatic radical having from one to 20 carbon atoms in its skeletal chain. The chain can be linear, branched or cyclic and may include oxygen atoms bonded only to carbon. Where present, any nonskeletal carbons are valence bonded primarily to fluorine atoms, although, occasionally hydrogen or chlorine can be included. Also, it is essential that nonskeletal valences of the carbon atom bonded to the adjacent bisacyl carbon atom of the hydrazido segment are bonded only to carbon or fluorine. It is preferred that all of these nonskeletal valences be satisfied with fluorine.

R' is a divalent organic radical free of olefinic unsaturation, active hydrogen and ionizable groups. R' can also contain an oxygen atom as part of its skeletal structure.

X can equal H, F. or CONNCOR''. If X equals H, R' must equal $CH_2$ and if X equals F, R' must equal $CF_2$.

It should be noted that if X equals CONNCOR'', R' is either alkylene, oxaalkylene, perfluoroalkylene or perfluorooxaalkylene.

In the above formula, R'' is a monovalent organic radical free of olefinic unsaturation, active hydrogen and ionizable groups.

The tetrakis compound is produced when X equals CONNCOR''. This compound may be represented structurally as follows:

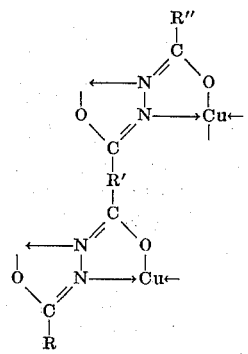

While there are a large variety of R, R' and R'' radicals which will form the chelates of this invention, from the standpoint of efficiency the smaller chain length alkyls are preferred, remembering, of course, that when R' equals $CH_2$ or $CF_2$ there can be no R''. It is also preferred that R be a perfluoro radical, i.e., have all of the carbon bonded hydrogens replaced by fluorine. (It should also be noted that both R' and R'' can, but need not, contain fluorine.) It is especially preferred that the R radical be $CF_3$, that R' radical be $CF_2$ or $CH_2$ and if X equals CONNCOR'' that R'' equal $CH_3$ or $CF_3$.

Examples of the ligands useful in forming the copper chelates of this invention are: $CF_3CONHNHCOC_3F_7$, $C_3F_7CONHNHCOC_3F_7$, $CF_3CONHNHCOCF_3$, $CF_3CONHNHCOCH_3CONHNHCDC_7F_{15}$, $CF_3CF_2OCF_2CONHNHCOCH_3$, $(CF_3CONHNHCOCF_2CF_2$, $(CF_3CONHNHCOCF_2CF_2)_2O$, $(CH_3CONHNHCOCF_{22})_2O$, and $[CF_3CONHNHCO(CF_2)_4]_2$.

Where X equals H, the ligands can be made as indicated below which, briefly, is comprised of the following series of reaction steps:

$$\text{I} \quad RCOOEt + N_2H_4 \longrightarrow$$

$$\text{II} \quad RCONHNH_2 + (R'CO)_2O \longrightarrow RCONHNHCOR'$$
$$\text{or } R'COCl$$

When a ligand is made in which R and R' are identical, the reaction may be completed in one step by using twice as much R'COCl as $N_2H_4$. To make the tetrakis derivative, two moles of $RCONHNH_2$ are reacted with one mole of $ClCOR'COCl$. The copper chelate of the invention is then formed by treating the ligand with a solution containing divalent copper, e.g., cupric acetate.

Elemental analysis of the chelate indicates that the copper:ligand ratio is approximately 1:1. The molecular weights of the chelates indicates that they are polymeric, e.g., the molecular weight of the compound having intrinsic formula $CF_3CONHNHCOCF_3(Cu)$ was found to be about 3,300. Infrared spectroscopy data indicate that the above-mentioned polymer has the following repeating structure:

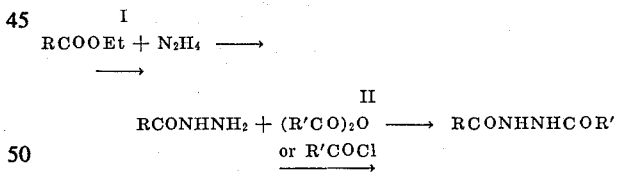

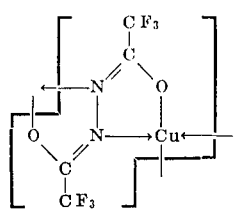

EXAMPLE 1

First a monohydrazide was formed by the following procedure. A solution of 180 g. (1.26 moles) of ethyl trifluoroacetate in 200 ml. of absolute ethanol was stirred and 45 g. (1.40 moles) of anhydrous hydrazine in 150 ml. of absolute ethanol was added dropwise with intermittent cooling to control the exothermic effect of the reaction mixture. After the reaction mixture stood overnight, alcohol was removed under vacuum at room temperature until the syrupy residue began to crystallize.

This product, i.e., $CF_3CONHNH_2$ was then treated as follows. Trifluoroacetic acid (200 g.) was added to dissolve most of the monohydrazide and 420 g. (2.0 moles) of $(CF_3CO)_2O$ was then added, with stirring, to the solution in a flask having an ice water cooled reflux condenser attached. As this reaction took place, the solution first became clear and then the bisacyl compound, i.e., $CF_3CONHNHCOCF_3$, crystallized.

After the reaction mixture had stood overnight, trifluoroacetic acid and excess anhydride were removed by aspiration. The crude bisacyl compound was then recrystallized from about 2 liters of anhydrous toluene to give 290 g. of the ligand.

(Recrystallization was done to purify the product but the sample prior to recrystallization is of sufficient purity for most uses.)

The ligand was then used to form the polymeric copper chelate. 2.0 g. of copper acetate in 10 cc. of water was added to a stirred solution of 4.5 g. of the ligand in 50 cc. of water. A green precipitate was immediately formed and filtered off, washed several times with water and dried on a steam bath. The precipitate was soluble in acetone, diethyl ether, ethanol, etc., and yielded a solution which was khaki brown in color.

EXAMPLE 2

The process of Example 1 was repeated except that $CF_3CONHNH_2$ was treated with a stoichiometric quantity of perfluorosebacyl chloride. After purification of the products there was obtained a white crystalline solid which was shown to be $CF_3CONHNHCO(CF_2)_8CONHNHCOCF_3$ by spectroscopic and elemental analysis.

This ligand was then used to prepare the copper chelate in the manner described in Example 1.

What is claimed is:

1. A copper chelate which contains fluorine and has the basic structural formula:

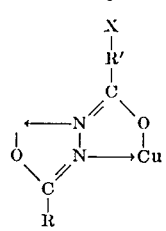

in which R is a monovalent, saturated fluoroaliphatic radical having from one to 20 carbons in which the nonskeletal valences of the carbon bonded to the bisacyl carbon atoms of the hydrazido segment are bonded only to carbon or fluorine;

R' is selected from the group consisting of $-CH_2-$ and $-CF_2-$;

X is selected from the class consisting of hydrogen and fluorine;

wherein R' is $-CH_2-$ when X is hydrogen, and R' is $-CF_2-$ when X is fluorine.

2. The product of claim 1 in which R contains not more than five carbons.

3. The product of claim 2 in which R' is $CH_2$ and X is H.

4. The product of claim 2 in which R' is $CF_2$ and X is F.

5. The product of claim 2 in which R consists of a perfluoroalkyl group.

6. A copper chelate which contains fluorine and has the basic structural formula:

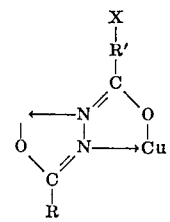

in which R is a monovalent, saturated fluoroaliphatic radical having from one to 20 carbons in which the nonskeletal valences of the carbon bonded to the bisacyl carbon atoms of the hydrazido segment are bonded only to carbon or fluorine;

R' is a divalent radical selected from the group consisting of alkylene, oxaalkylene, perfluoroalkylene and perfluorooxaalkylene radicals;

X is CONNCOR" where R" is $CH_3$ or a monovalent saturated fluoroaliphatic radical having not more than five carbons.

7. The product of claim 6 in which R and R" are identical.

8. The product of claim 7 in which R' is perfluoroalkylene.

9. The product of claim 7 in which R and R" each are $CF_3$.

10. The product of claim 7 in which R' is $CF_2$.

* * * * *

UNITED STATES PATENT OFFICE
CERTIFICATE OF CORRECTION

Patent No. 3,682,995          Dated August 8, 1972

Inventor(s) Paul H. Ogden

It is certified that error appears in the above-identified patent and that said Letters Patent are hereby corrected as shown below:

Column 1, line 28 - After "a" insert --layer of the chelate remains on the-- .

Column 1, line 37 - Delete "which can be represented structurally as follows:".

Column 2, line 36 - After "$CF_3CONHNHOCH_3$" insert a comma (,); delete "$CONHNHCDC_7F_{15}$" and insert
-- $CF_3CONHNHCOC_7F_{15}$ --

Column 2, line 38 - Between the two formulae present insert
-- $(CF_3CONHNHCOCF_2CF)_2O$ --

Column 2, line 39 - Delete "$(CH_3CONHNHCOCF_{22})_2O$" and insert
-- $(CH_3CONHNHCOCF_2CF_2)_2O$ -- .

Signed and sealed this 8th day of May 1973.

(SEAL)
Attest:

EDWARD M. FLETCHER, JR.
Attesting Officer

ROBERT GOTTSCHALK
Commissioner of Patents